(12) United States Patent
Haber et al.

(10) Patent No.: US 9,904,960 B2
(45) Date of Patent: Feb. 27, 2018

(54) IDENTIFYING DEFUNCT NODES IN DATA PROCESSING SYSTEMS

(71) Applicant: International Business Machines Corporation, Armonk, NY (US)

(72) Inventors: Marc N. Haber, Efrat (IL); Boris Melamed, Efrat (IL); Gideon Sireling, Jerusalem (IL); Gidi Weber, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/410,851

(22) Filed: Jan. 20, 2017

(65) Prior Publication Data

US 2017/0236219 A1    Aug. 17, 2017

Related U.S. Application Data (63) Continuation of application No. 15/044,144, filed on Feb. 16, 2016.

(51) Int. Cl.
| | |
|---|---|
| *G06F 11/00* | (2006.01) |
| *G06Q 40/00* | (2012.01) |
| *G06F 17/30* | (2006.01) |

(52) U.S. Cl.
CPC ....... *G06Q 40/12* (2013.12); *G06F 17/30554* (2013.01); *G06F 17/30994* (2013.01); *G06F 17/30997* (2013.01)

(58) Field of Classification Search
CPC ............... G06Q 10/103; G06F 11/3079; G06F 11/3065; G06F 11/3672; G06F 2221/2119; G06F 21/14; G06F 17/3089; G06F 17/30554; G06F 17/30994; G06F 17/30997; H04L 67/02
See application file for complete search history.

(56) References Cited

U.S. PATENT DOCUMENTS

| | | |
|---|---|---|
| 7,050,981 B2 | 5/2006 | Smith et al. |
| 8,396,827 B2 | 3/2013 | Gross et al. |
| 8,495,033 B2 | 7/2013 | Gowdra |

(Continued)

FOREIGN PATENT DOCUMENTS

| | | |
|---|---|---|
| JP | 5740702 B2 | 6/2015 |

OTHER PUBLICATIONS

IBM, "IBM InfoSphere Metadata Workbench Version 8 Release 7", 2011, IBM, pp. 1-72.*
IBM, "IBM InfoSphere Information Server Managing Operational Metadata Version 8 Release 7", 2011, IBM, pp. 1-32.*
IBM, "IBM InfoSphere Information Server Managing Common Metadata Version 8 Release 7", 2013, IBM, pp. 1-117.*

(Continued)

*Primary Examiner* — Bryce Bonzo
*Assistant Examiner* — Jeison C Arcos
(74) *Attorney, Agent, or Firm* — Robert J. Shatto (57) ABSTRACT

A computer system may generate a lineage graph for a data processing system. The lineage graph may contain one or more nodes, and it may identify the flow of data through the data processing system. The computer system may determine that a first node in the lineage graph defunct. The computer system may then generate a report for the data processing system and provide the report to a user. The report may include an explanation of why the first node is defunct. The computer system may insert an indication that the first node is defunct into metadata for the first node. The indication may also include the explanation of why the first node is defunct.

1 Claim, 7 Drawing Sheets

(56) References Cited

U.S. PATENT DOCUMENTS

| | | | |
|---|---|---|---|
| 8,868,497 B2 | 10/2014 | Yan et al. | |
| 8,875,298 B2 | 10/2014 | Li et al. | |
| 9,015,831 B2 | 4/2015 | Scott et al. | |
| 9,208,319 B2 | 12/2015 | Avgerinos et al. | |
| 2006/0095466 A1* | 5/2006 | Stevens | G06F 17/30398 |
| 2007/0240138 A1 | 10/2007 | Chess et al. | |
| 2009/0216728 A1* | 8/2009 | Brainerd | G06F 17/30994 |
| 2009/0310816 A1* | 12/2009 | Freire | G06F 17/30312 382/100 |
| 2011/0238379 A1* | 9/2011 | Misra | G06F 19/3418 702/187 |
| 2011/0270853 A1* | 11/2011 | Curbera | G06F 17/30958 707/755 |
| 2011/0295794 A1 | 12/2011 | Venkatasubramanian et al. | |
| 2011/0320460 A1* | 12/2011 | Fankhauser | G06Q 10/10 707/748 |
| 2012/0173747 A1* | 7/2012 | Roesch | G06Q 10/063 709/231 |
| 2013/0073513 A1 | 3/2013 | Kemper et al. | |
| 2013/0166498 A1 | 6/2013 | Aski et al. | |
| 2013/0325787 A1* | 12/2013 | Gerken | G06N 7/005 706/52 |
| 2014/0173741 A1 | 6/2014 | Gluck et al. | |
| 2014/0222994 A1* | 8/2014 | Castro | H04L 43/08 709/224 |
| 2014/0279979 A1* | 9/2014 | Yost | G06F 17/30309 707/695 |
| 2015/0012314 A1* | 1/2015 | Mohammad | G06Q 10/063 705/7.11 |
| 2015/0160969 A1 | 6/2015 | Kishore et al. | |
| 2015/0227595 A1 | 8/2015 | Sadovsky et al. | |

OTHER PUBLICATIONS

Chao et al., "Advanced graph model for tainted variable tracking", Science China, Information Sciences, Nov. 2013, vol. 56, published online Sep. 30, 2012, pp: 112105:1-112105:12. DOI: 10.1007/s11432-012-4674-8.

Ganesan et al.,"ETL Design and Development 101," SETLabs Briefings, vol. 3, No. 4, Oct.-Dec. 2005, pp. 3-8, http://www.infosys.com/infosys-labs/publications/Documents/SETLabs-briefings-data-management.pdf.

Jorg et al., "Formalizing ETL Jobs for Incremental Loading of Data Warehouses," pp. 327-346, http://cs.emis.de/LNI/Proceedings/Proceedings144/332.pdf.

Unknown, "MyEclipse Reports—Working with MyEclipse JDBC Data Sources," MyEclipse Reporting Tutorial, 6 pgs., Nov. 26, 2014, http://www.myeclipseide.com/documentation/reporting/datasource/.

Unknown, "Varonis Usage Example: Identifying Stale Data and Groups", Varonis, The Business Case for Data Governance, Varonis Systems, Inc., 8 pgs., www.varonis.com/downloads/Varonis-Stale-Data-and-Groups-Solution.pdf.

Unknown, "FlowDroid—Taint Analysis", Secure Software Engineering at the European Center for Security and Privacy by Design—EC, SPRIDE, 4 pages. Last printed on Nov. 18, 2015. http://sseblog.ec-spride.de/tools/flowdroid/.

Haber et al., "Identifying Defunct Nodes in Data Processing Systems," U.S. Appl. No. 15/044,144, filed Feb. 16, 2016.

Anonymous, "Automatically Identifying Defunct Sources, Consumers, and Transformations in Data Processing Systems", ip.com, An IP.com Prior Art Database Technical Disclosure, IP.com No. 000242174, 4 pages, Grace Period Disclosure.

List of IBM Patents or Patent Applications Treated as Related, Jan. 19, 2017, 2 pgs.

\* cited by examiner

| Node | Active/Passive | Type | Condition | Explanation |
|---|---|---|---|---|
| 401 | Active | Producer | Stale | Time since last activity > Threshold |
| 402 | Active | Producer | Stale | Time since last activity > Threshold |
| 403 | Passive | Producer | Stale | Time since last data change > Threshold |
| 404 | Active | Producer | OK | |
| 405 | Active | Transformer | Stale | All inputs are stale |
| 406 | Active | Transformer | Tainted | At least 1 input is stale |
| 407 | Active | Transformer | Tainted | At least 1 input is tainted |
| 408 | Passive | Consumer | Tainted | At least 1 input is tainted |
| 409 | Passive | Consumer | Tainted | At least 1 input is tainted |
| 410 | Active | Transformer | Redundant | All outputs are redundant |
| 411 | Passive | Consumer | Redundant | Time since last observed > Threshold |

IDENTIFYING DEFUNCT NODES IN DATA PROCESSING SYSTEMS

STATEMENT REGARDING PRIOR DISCLOSURES BY THE INVENTOR OR A JOINT INVENTOR

The following disclosure is submitted under 35 U.S.C. 102(b)(1)(A): DISCLOSURE: ANONYMOUS, "Automatically Identifying Defunct Sources, Consumers, and Transformations in Data Processing Systems," ip.com, An IP.com Prior Art Database Technical Disclosure, IP.com Number: 000242174, 4 pages.

BACKGROUND

The present disclosure relates generally to the field of data processing systems, and more particularly to automatically identifying defunct nodes in data processing systems.

Data processing systems include a combination of assets (e.g., machines, applications, files, and processes) that process information and produce a set of outputs. Data processing systems often perform tasks such as converting data from one format to another, validate data (e.g., ensure that it is correct), sort data, aggregate data, or analyze the data. For example, an accounting application may retrieve revenue and expense data for an entity, process the data, and output a profits report for the entity.

SUMMARY

Embodiments of the present invention disclose a method, computer program product, and system for automatically identifying defunct nodes in data processing systems. A computer system may generate a lineage graph for a data processing system. The lineage graph may contain one or more nodes, and it may identify the flow of data through the data processing system. The computer system may identify a first node in the lineage graph. The computer system may determine that the first node is a defunct node. The computer system may then generate a report for the data processing system and provide the report to a user. The report may include an explanation of why the first node is defunct. The computer system may also add an indication that the first node is defunct into metadata for the first node. The indication may also include the explanation of why the first node is defunct.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of data processing systems, and in particular to automatically identifying defunct nodes in data processing systems. While the present disclosure is not necessarily limited to such applications, various aspects of the disclosure may be appreciated through a discussion of various examples using this context.

Organizations often remove unneeded assets (e.g., data sources, consumers, and transformations) from their data processing system in an ad-hoc fashion. For example, an asset may only be removed after someone happens to notice that the asset is no longer required or valid, or after someone determines that there is a problem with the asset (e.g., it is taking an excessive amount of time to process). Organizations with more rigorous controls may impose a regular audit of all assets. While this may be effective at identifying and removing defunct assets in a timely fashion, it is often a manual process with a large associated cost in human effort and time.

Ad-hoc or periodic removal of assets from data processing systems may not be satisfactory to an organization for numerous reasons. For example, unneeded assets may continue to be processed until they are noticed or until the next regular audit occurs. For large data processing systems, this may amount to a large waste in processing resources and energy that could have been better used elsewhere. Likewise, business decisions may be made using outdated data if defunct sources are not removed from the data processing system.

Additionally, an organization may have regulatory requirements that it must follow, requiring careful oversight of the data processing system. For example, financial regulations may require that an organization demonstrate veracity in its financial reporting by proving that all of its data sources are current. Reliance on defunct data sources may violate those financial regulations. As another example, a health services provider may be required to ensure that protected health information is only stored or processed as necessary. As such, an organization may violate the regulations if they unnecessarily keep protected health information in their data processing system.

Accordingly, a user may wish to automatically receive a notification when an asset has become defunct so that he can quickly and efficiently remove the asset from the data processing system. Embodiments of the present disclosure include a computer implemented method for identifying defunct nodes in a data processing system. A computer system may identify one or more nodes in a data processing system. The computer system may then analyze each node to identify condition information for the node. Condition information may include any information used to determine whether a node is defunct. For example, condition information may include the amount of time since a node was last active, the amount of time since a node was last viewed by a user, or the amount of time since a node's data was last updated. The computer system may compare the condition information to various thresholds to determine whether a node is defunct.

In some embodiments, after analyzing each node to determine which are defunct, the computer system may mark the defunct nodes. For example, the computer system may change a condition field in a node's metadata to mark it as defunct. The computer system may also insert an explanation of why the node was marked as defunct into the metadata. In embodiments where nodes are assigned a condition score, the score may be included in the metadata.

In some embodiments, the computer system may generate a report for the data processing system. The report may indicate which nodes are defunct. The report may also include the explanation of why the nodes are considered defunct. The computer system may provide the report to a user. For example, the computer system may transmit the report to an output device (e.g., a tablet or smartphone), or display the report on a computer monitor. The computer system may then prompt the user to determine whether to remove the defunct nodes from the data processing system. If the user indicates that one or more of the defunct nodes should be removed (e.g., by selecting them from a list of defunct nodes), the computer system may remove the selected defunct nodes from the data processing system.

The flow of data through a data processing system may be visualized using a lineage graph. A lineage graph, also known as a lineage diagram, is a data flow diagram that describes the flow of data through and/or across a data processing system. A lineage graph may include one or more nodes and directed lines connecting the nodes. A node may include any asset in a data processing system that is capable of generating, manipulating, accessing, or storing data. For example, a node may be a database, a file, an application, or a computer system. The directed lines may indicate the direction that data flows between the nodes.

Nodes may be classified as active, passive, or as hybrid nodes. A node is considered active if it pushes new data into the lineage graph (e.g., transmits new data to another node), retrieves data as needed (e.g., pulls data from another node), or modifies data (e.g., changes the format of the data). Nodes that are not considered active nodes are classified as passive nodes. For example, a file or database that just stores data may be a passive node. Some nodes may exhibit characteristics of both an active node and a passive node. These nodes are classified as hybrid nodes. For example, an application that retrieves data the first time a report is viewed (indicative of an active node) and then caches the report for future views (indicative of a passive node) may be classified as a hybrid node.

In addition to being classified as either active or passive, nodes in a lineage graph may be classified by their node type. Each node type may correspond to a different function of the node within the flow of data. For example, a node that generates, retrieves, or stores data that is either pushed to, or pulled by, another node in the lineage graph may be considered a producer node, also known as a source node. In other words, a producer node may be a node that acts as a source of data for one or more other nodes or through which data enters the lineage graph (e.g., a node that generates new data). Producer nodes may be either active or passive. For example, an active producer may push fresh data into a lineage graph, while a passive producer may generate or store fresh data that other nodes may pull.

A second node type may be a consumer node, also known as a sink node. A consumer node may act as a destination for data (e.g., is the node where data in the lineage graph terminates). For example, a consumer node may be a business intelligence (BI) report that is generated at the end of a data processing system. Consumer nodes may be either passive or active. For example, an active consumer node may pull data from another node (e.g., from a database), while a passive consumer may receive data that was pushed to it by another node in the lineage graph.

A third node type may be a transformer node. A transformer node (also known as a data transformer) may be a node that manipulates or transforms data. Transformer nodes may additionally store the transformed data or transmit the transformed data to another node. For example, a transformer node may be used in an extract, transform, and load (ETL) operation to extract data from one or more data sources, transform the data into the proper format or structure for data analysis, and load (or transmit/export) the data to another node (such as an operational data store, a data mart, or a data warehouse). Transformer nodes may always be considered active nodes.

In some embodiments, the node type may refer to both whether a node is active or passive, as well as whether the node is a producer, transformer, or consumer. For example, an active producer may be a first node type, and an active transformer may be a second node type.

Nodes may be in one of three conditions: operational, defunct, or tainted. An active node may be considered defunct if it has not been active for a predetermined period of time, or if its activation history shows a substantial decline. A passive producer may be considered defunct if its data has not changed for a predetermined period of time. A passive consumer may be considered defunct if it has not be purposefully observed (e.g., viewed by a user) for a predetermined period of time. As used herein, a defunct producer may be considered "stale," a defunct consumer may be considered "redundant," and a defunct transformer may be considered to be both a stale producer and a redundant consumer.

Additionally, the condition of a node may depend on the condition of the nodes to which it is attached. For example, a node may be considered stale if all of its inputs (e.g., each node from which it receives data) are stale. Likewise, a node may be considered redundant if all of its outputs (e.g., each node to which it sends data) are redundant. A node may be classified as tainted when some, but not all, of its inputs are stale, or if some, but not all, of its outputs are redundant. A node may also be classified as tainted if any of its inputs are tainted.

Figure 1:
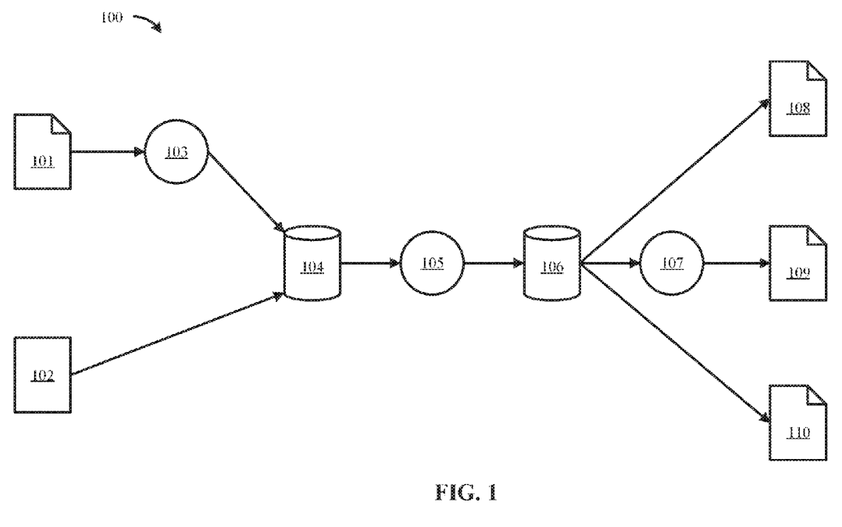
FIG. 1 illustrates an example lineage graph for a data processing system, in accordance with embodiments of the present disclosure.

Turning now to the figures, FIG. 1 illustrates an example lineage graph 100 for a data processing system, in accordance with embodiments of the present disclosure. The lineage graph 100 includes ten nodes 101-110. The nodes 101-110 may be hosted on one or more computer systems, also known as compute nodes.

As discussed herein, each node 101-110 in the lineage graph 100 may be classified as either active, passive, or hybrid. Furthermore, each node may be a producer, transformer, or consumer of data. For example, the first node 101 may be a passive producer node. The first node 101 may be considered a passive producer because it is a source of data and it does not actively push data into the lineage graph 100, pull data from another node, or transform data. For example, the first node 101 may be a file that stores data. The third node 103 may be a transformer node (e.g., an application) that performs an ETL operation on the data stored in the first node 101. The third node 103 may extract the data from the first node 101, transform the data (e.g., change the format of the data), and load the data into the fourth node 104, which may be a staging database where data from the first and second nodes 101 and 102 is stored.

The second node 102 may be an active producer node. For example, the second node 102 may be an application that stores or generates data and pushes the data into the lineage graph 100 (e.g., the second node 102 may push data directly to the fourth node 104). The data stored in the second node 102 may be "direct move," or "pass through," data because it does not need to be transformed before being stored in the fourth node 104.

The fifth node 105 may be a transformer node that performs an ETL operation on the data stored in the fourth node 104. The fifth node 105 may output the transformed data to the sixth node 106, which may be a data mart that stores the transformed data. The eighth and tenth nodes 108 and 110 may be active consumer nodes. For example, the eighth and tenth nodes 108 and 110 may be BI reports that actively pull data from the sixth node 106 whenever they are executed (e.g., viewed). The eighth node 108 may generate a BI report using sales data stored in the sixth node 106, and the tenth node 110 may generate a BI report uses the expenses data stored in the sixth node 106. The ninth node 109 may be a passive consumer node. For example, the ninth node 109 may be a BI report (e.g., relating to profits) that does not automatically retrieve data from the sixth node 106. Instead, the seventh node 107 may periodically pull data from the sixth node 106 and update the BI report (e.g., the ninth node 109).

Data may flow through the lineage graph 100 from a source (or producer) node, such as the first and second nodes 101 and 102, to a sink (or consumer) node, such as the eighth, ninth, and tenth nodes 108-110. This flow from source to sink may be referred to herein as an execution path or a lineage path. In addition, a flow from one node to another may also be referred to as an execution path in various contexts.

Each node may be associated with metadata. The metadata may include information useful in determining whether the node is defunct or in generating a condition score for the node. Such information is referred to herein as "condition information." For example, the metadata may include condition information regarding data governance (e.g., business or regulatory rules based on the type of data stored or used by the node), timestamps (e.g., when the node was created, when it was last active, when it was last viewed, and/or when the node was last updated), thresholds (e.g., how long a node must be inactive before it is considered defunct), information regarding database schema, or custom properties (e.g., whether the node is considered critical). Other condition information may include various usage statistics such as activation history (e.g., how often the node is active), observation history (e.g., how often the node is observed), and update history (e.g., how often the node's data changes). The custom properties stored in the metadata may be managed (e.g., updated) by an ETL tool, governance tools, or by some other means. The metadata may be generated by a user (e.g., a user may set the thresholds manually) or by data sources themselves (e.g., the data sources may specify how long the data may be stored by node without being accessed before it must be deleted).

For example, regulations promulgated by a government or governing authority may limit how long protected health information (e.g., health information about people that is protected by one or more laws or regulations) can be stored if it is not being actively used. Protected health information may include any information about health status (e.g., medical conditions), provision of health care (e.g., list of prescription), patient identity (e.g., the patient's name), or payment for health care (e.g., health insurance beneficiary numbers or account numbers) that can be linked to a specific user. Protected health information may include, but is not limited to, an individual's name, geographic identifiers (e.g., the individual's zip code), dates (e.g., birthday), phone number, fax number, email address, Social Security number, medical record number, health insurance account number, device identifiers and/or serial numbers (e.g., pacemaker serial number), biometric identifiers (e.g., finger, retinal, and/or voice prints), and photographic images.

Accordingly, a user may establish a time limit (e.g., a threshold) that is compliant with the government regulations. The time limit may be the maximum amount of time that protected health information is allowed to remain in the data processing system without being acted on in some way (e.g., transformed, updated, pushed to another node, pulled from a node, or viewed by a user). The time limit may be saved into the metadata of any nodes that store or process protected health information. This may allow a computer system to automatically flag a node that stores protected health information for deletion when it has not been actively used for a period of time greater than the time limit established by the user.

Figure 2:
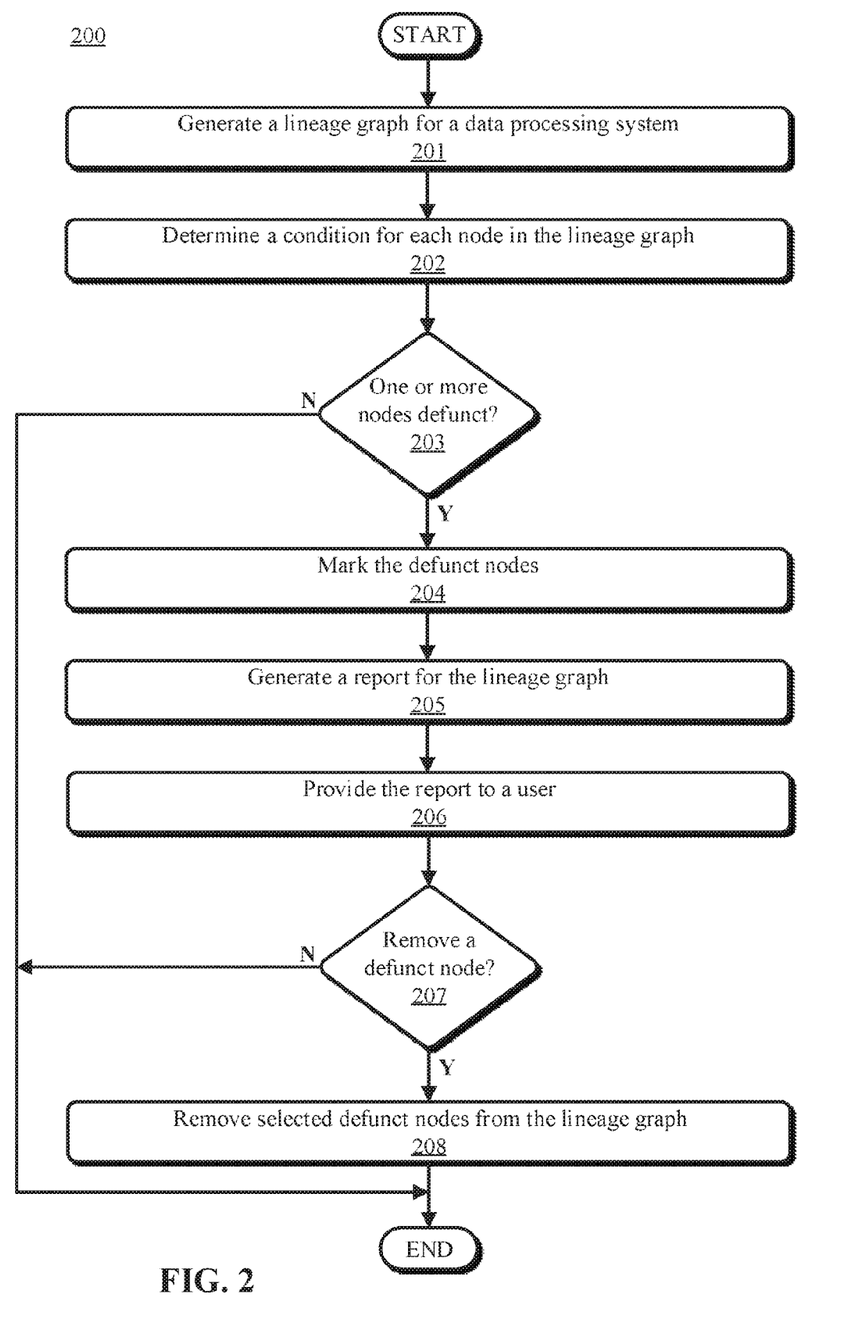
FIG. 2 illustrates a flowchart of an example method for automatically identifying and removing defunct nodes in a data processing system, in accordance with embodiments of the present disclosure.

Referring now to FIG. 2, shown is a flowchart of an example method 200 for automatically identifying and removing defunct nodes of a data processing system, in accordance with embodiments of the present disclosure. The method 200 may be performed by a computer system. In some embodiments, one or more operations in the method 200 may be performed by a user, or by the computer system in response to user input. The method 200 may begin at operation 201, where the computer system may generate a lineage graph for a data processing system.

As discussed herein, the lineage graph for the data processing system may be a directed graph that includes one or more nodes. Each node may correspond to a particular asset (e.g., file, database, application, report) in the data processing system. The lineage graph may indicate the direction of flow of data in and through the data processing system. After generating the lineage graph at operation 201, the computer system may determine a condition for one or more of the nodes in the lineage graph at operation 202. In some embodiments, the computer system may determine a condition for each node in the lineage graph. In other embodiments, the computer system may determine a condition for a subset of nodes in the lineage graph (e.g., only the nodes that store or manipulate protected health information).

In some embodiments, in order to determine the condition of the nodes in the lineage graph, the computer system may analyze each node to determine whether it is defunct. The computer system may compare condition information (e.g., time since last active) for each node to associated thresholds. Because the condition of a node may depend on the condition of other nodes within its execution path (e.g., a node's condition may depend on nodes before and/or after it in the execution path), the computer system may recursively analyze the lineage graph multiple times to determine the condition of each node. In other words, the computer system may inspect each node to identify defunct nodes. The computer system may then inspect each node again (e.g., make a second pass through the lineage graph) and identify new defunct nodes. This may continue until the computer system does not identify any additional defunct nodes. An example method for determining whether a node is defunct is discussed in more detail in reference to FIG. 3.

In some embodiments, the condition of the nodes may not be ternary (e.g., defunct, operational, or tainted). Instead, the computer system may generate a condition score for each node. The condition score for a particular node may indicate the likelihood that the particular node is a defunct node. For example, each node may be assigned a condition score between 0 and 100, with a score of 0 indicating that the node is very unlikely to be defunct, and a score of 100 indicating that the node is very likely to be defunct.

In order to generate the condition score for each node, the computer system may use the same metrics as discussed above. For example, the computer system may score each active node based, at least in part, on the amount of time since it was last active. As another example, passive consumers may be scored based on the amount of time since the nodes were last purposefully observed (e.g., looked at by a user), among other factors. As yet another example, passive producers may be scored based on the amount of time since the data stored in the node was last updated, among other factors.

The computer system may also consider other factors when generating a condition score for each node. For example, a node being marked as critical or necessary (e.g., an exception handler or archiving node) may affect the condition score for the node. Additionally, the computer system may consider the amount of time since a node's metadata has been changed. For example, a node having metadata recently assigned to it may indicate that the node is still considered necessary, particularly if the metadata was manually assigned specifically to the node (e.g., by a user) instead of automatically generated (e.g., by the computer system) or assigned to a group of nodes.

In some embodiments, the computer system may also consider the node's function when generating the condition score. For example, a node that archives previous versions of BI reports may have a lower condition score than other nodes because archiving nodes may not be expected to be active as often as other nodes. In some embodiments, the computer system may consider the number of inputs and/or outputs that a node has when generating the condition score. An input or output for a particular node, as referred to herein, includes nodes that are connected to the particular node. For example, nodes that push data to the particular node (or nodes from which the particular node pulls data) may be considered input nodes (or simply inputs) for the particular node. Likewise, nodes that pull data from a particular node (or nodes to which the particular node pushes data) may be considered output nodes (or simply outputs) for the particular node. A node with many outputs may have a lower condition score than a similar node with fewer outputs because the number of outputs may correlate with the importance of the node.

After determining the condition of each node in the lineage graph at operation 202, the computer system may determine whether there are any defunct nodes in the lineage graph at decision block 203. In embodiments where a condition score is generated for one or more nodes, the computer system may compare the condition score to a condition score threshold. If the condition score for a node exceeds the condition score threshold, the computer system may determine that the node is a defunct node. Otherwise, the computer system may determine that the node is not a defunct node.

If there are no defunct nodes in the lineage graph, the method 200 may end. If the computer system determines that there are defunct nodes in the lineage graph at decision block 203, the computer system may mark the defunct nodes at operation 204. The computer system may mark the defunct nodes by modifying metadata associated with the defunct nodes to indicate that the node is defunct. The marking may include identifying the type of node (e.g., active producer, passive consumer), as well as the condition of the node (e.g., stale, redundant, tainted). The metadata of the node may also be modified to include an explanation of why the node is considered defunct. For example, the computer system may determine that a particular node is defunct (e.g., redundant) because all of its outputs connect to redundant nodes. Accordingly, the metadata for the particular node may note that the node is redundant, and that the reason for it being marked redundant is that all of its outputs are redundant. In some embodiments, the computer system may include the condition score in the metadata.

After marking the defunct nodes at operation 204, the computer system may generate a report for the data processing system at operation 205. The report may identify each node in the lineage graph, whether the nodes are active or passive, the node type for each node (e.g., consumer, transformer, producer), and the condition of each node. Additionally, the report may include an explanation of why each defunct node is marked as such. Other information that may be in the report includes, but is not limited to, a unique identifier for each node, a list of nodes that act as inputs for each node, a list of nodes that act as outputs for each node, and condition information for each node (e.g., when each node was last active, when each node was last viewed, etc.).

After generating the report for the lineage graph at operation 205, the computer system may provide the report to a user at operation 206. For example, the computer system may transmit the report to an output device (e.g., a smartphone or tablet) or display the device on a computer monitor. After providing the report to the user at operation 206, the computer system may determine whether to remove one or more of the defunct nodes at decision block 207. In some embodiments, the computer system may be configured to automatically remove all defunct nodes.

In some embodiments, one or more nodes may be flagged (e.g., in metadata associated with the node) as being a critical or important node. The nodes may be nodes that are particularly important to the data processing system. In some embodiments, nodes may be marked as critical by a user, by a computer system using heuristic information about the nodes such as its name or type, or a combination of the two. The computer system may determine that these nodes should not be removed, even if they are defunct.

For example, a passive consumer node may exist for archival purposes. The node may be viewed infrequently, and accordingly may be marked as defunct, particularly if the computer system is configured to use one threshold for all passive consumer nodes. As another example, a transformer node may be an exception handler. Because the exception handler may be infrequently active, it may be marked as defunct. In either case, the node may be flagged as being an important node. Accordingly, the computer system may not remove the node even if it is marked as defunct.

In some embodiments, the computer system may prompt the user to decide whether the defunct nodes should be removed from the lineage graph. For example, the computer system may provide a list of all nodes marked as defunct to the user and prompt the user to select the defunct nodes that should be removed. The computer system may also provide the condition information for the defunct nodes, particularly information relating to the reason that the nodes were identified as defunct. The user may then select to keep all of the defunct nodes, remove all of the defunct nodes, or remove some of the defunct nodes and leave others. In some embodiments, the computer system may automatically remove some defunct nodes (e.g., the defunct nodes that are not critical), and the user may be prompted regarding the other defunct nodes (e.g., the defunct nodes that are not critical).

In some embodiments where nodes are assigned a condition score, the computer system may automatically remove nodes with a score that exceeds a threshold. For example, each node may be scored on a 0 to 100 scale, with 0 indicating that the node is not defunct, and 100 indicating that the node is defunct. The computer system may automatically remove all nodes receiving a condition score above 70. The computer system may then prompt the user to determine whether to remove any of the remaining nodes. For example, the computer system may provide a list of all nodes that have a condition score between 50 and 70. The computer system may also prompt the user to decide which, if any, of those nodes should be removed.

If the computer system determines that it should not remove defunct nodes at decision block 207, the method 200 may end. If the computer system determines that it should remove one or more defunct nodes at decision block 207, the computer system may remove one or more of the defunct nodes at operation 208, and the method 200 may end. In some embodiments, removing defunct nodes may include disabling, retiring, or deleting a job (e.g., an ETL job) or a store procedure. In other embodiments, removing defunct nodes may include deprecating a database table or column. In still other embodiments, removing defunct nodes may include deleting a BI report configuration.

Figure 3:
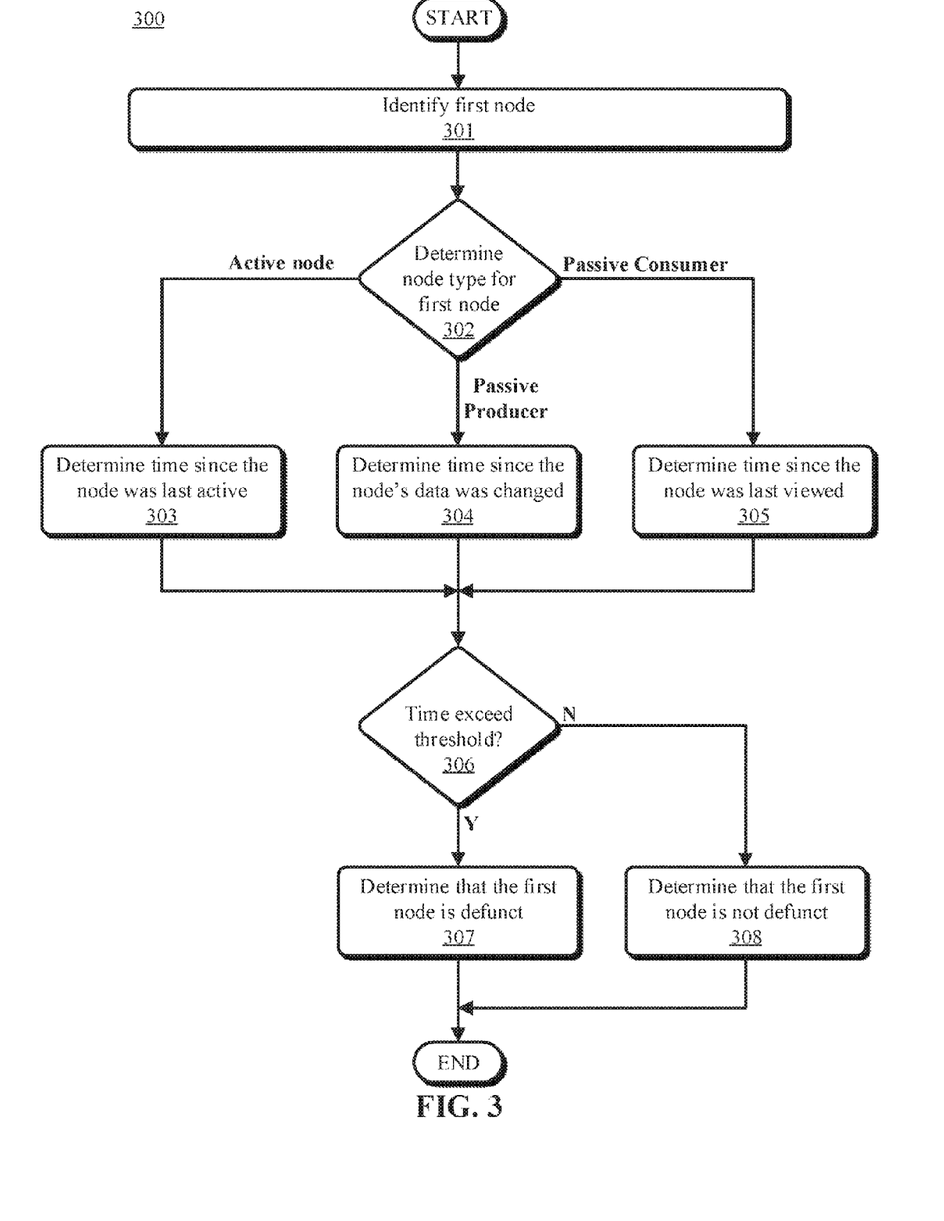
FIG. 3 illustrates a flowchart of an example method for determining whether a node in a data processing system is defunct, in accordance with embodiments of the present disclosure.

Referring now to FIG. 3, shown is a flowchart of an example method 300 for determining whether a node in a data processing system is defunct, in accordance with embodiments of the present disclosure. The method 300 may be performed by a computer system. In some embodiments, one or more operations in the method 300 may be performed by a user, or by the computer system in response to user input. The method 300 may begin at operation 301, where the computer system may identify a first node in a lineage graph.

At operation 302, the computer system may determine the node type for the first node. As discussed herein, the computer system may determine whether the node is active or passive, and whether the node is a producer, consumer, or transformer. If the computer system determines that the first node is an active node (regardless of whether it is a producer, consumer, or transformer) at operation 302, the computer system may determine the amount of time since the first node was last active (e.g., when the first node last pushed, pulled, or transformed data) at operation 303.

In some embodiments, the computer system may use metadata associated with the first node to determine the amount of time since the first node was last active. Whenever the first node is active (e.g., whenever the first node pushes new data into the lineage graph), a timestamp in the metadata may be updated. The computer system may compare the timestamp to the current time to determine the amount of time since the first node was last active.

After determining the amount of time since the first node was last active at operation 303, the computer system may determine whether the amount of time exceeds a threshold (e.g., an activation threshold) at decision block 306. The activation threshold may be the longest amount of time that an active node may go without being active before the node is considered defunct. In some embodiments, the activation threshold may be specific to the first node. In these embodiments, the activation threshold may be saved in the metadata for the first node. In other embodiments, the activation threshold may apply to all active nodes in the lineage graph. In yet other embodiments, the activation threshold may apply to a subset of active nodes in the lineage graph. The subset of active nodes may include the first node. If the computer system determines that the amount of time since the first node was last active exceeds the activation threshold at decision block 306, the computer system may determine that the first node is defunct at operation 307 and the method 300 may end. Otherwise, the computer system may determine that the first node is not defunct at operation 308 and the method 300 may end.

In some embodiments, the computer system may determine that an active node is defunct (or generate a condition score for an active node), using the node's activation history. The activation history for a node may include information relating to how often the node has been active (e.g., an activation rate for the node). For example, the activation history for a particular node may show that over the past 30 days, the node has been active (e.g., the node has pulled data into the lineage graph) roughly 2 times a day on average. Additionally, the activation history may include information regarding a change in how often a node is active (e.g., a change in the activation rate, also referred to as an activation acceleration). Continuing the example from above, the activation history for the node may indicate that the node has only been active once over the last 10 days. In some embodiments, the time periods used to determine the activation rate or activation acceleration may be set by a user.

The computer system may determine whether an active node is defunct by comparing the activation rate to an activation rate threshold. If the activation rate for the node is less than the activation rate threshold, the computer system may mark the node as defunct. Likewise, the computer system may determine that the node is defunct if its activation acceleration over a predetermined period of time is less than an activation acceleration threshold. In some embodiments, the activation rate threshold and/or activation acceleration threshold may be set by a user and saved in metadata for the node.

As discussed herein, in some embodiments the computer system may generate a condition score for a node instead of determining whether it is defunct or not defunct (e.g., instead of assigning the node a binary condition). The computer system may use any statistical method or model for generating the condition score. In these embodiments, the computer system may use the activation history (e.g., the activation rate or acceleration) of a node as a component when determining the condition score. For example, a high activation rate may lower the condition score (where a lower score means the node is less likely to be defunct) because it may indicate that the node is frequently pulling fresh data into the lineage graph, or it is frequently transforming data that is then used by other nodes.

If the computer system determines that the first node is a passive producer at operation 302, the computer system may determine the amount of time since the first node's data was last changed at operation 304. In some embodiments, the computer system may use metadata associated with the first node to determine the amount of time since the first node's data was last changed. Whenever the first node's data is updated, a timestamp in the first node's metadata may be updated. The computer system may compare the timestamp to the current time to determine the amount of time since the first node's data was last updated.

After determining the amount of time since the first node's data was last changed at operation 304, the computer system may determine whether the amount of time exceeds a threshold (e.g., new data threshold) at decision block 306. The new data threshold may be the longest amount of time that a passive producer node may go without having its data updated or changed before the node is considered defunct. In some embodiments, the new data threshold may be specific to the first node. In these embodiments, the new data threshold may be saved in the metadata for the first node. In other embodiments, the new data threshold may apply to all passive producer nodes in the lineage graph. In yet other embodiments, the new data threshold may apply to a subset of passive producers in the lineage graph. The subset of passive producers may include the first node. If the computer system determines that the amount of time since the first node's data was last updated exceeds the new data threshold at decision block 306, the computer system may determine that the first node is defunct at operation 307 and the method 300 may end. Otherwise, the computer system may determine that the first node is not defunct at operation 308 and the method 300 may end.

In some embodiments, the computer system may determine that a passive producer node is defunct (or generate a condition score for a passive producer node), using the node's update history. The update history for a node may include information relating to how often the node's data has been changed or updated (e.g., an update rate for the node). For example, the update history for a particular node may show that over the past 30 days, the node's data has been changed roughly 2 times a day on average. Additionally, the update history may include information regarding a change in how often a node's data is updated (e.g., a change in the update rate, also referred to as an update acceleration). Continuing the example from above, the update history for the node may indicate that the node's data has only been changed once over the last 10 days. In some embodiments, the time periods used to determine the update rate or update acceleration may be set by a user.

The computer system may determine whether a passive producer node is defunct by comparing the update rate to an update rate threshold. If the update rate for the node is less than the update rate threshold, the computer system may mark the node as defunct. Likewise, the computer system may determine that the node is defunct if its update acceleration over a predetermined period of time is less than an update acceleration threshold. In some embodiments, the update rate threshold and/or update acceleration threshold may be set by a user and saved in metadata for the node.

As discussed herein, in some embodiments the computer system may generate a condition score for a node instead of determining whether it is defunct or not (e.g., instead of assigning the node a binary condition). The computer system may use any statistical method or model for generating the condition score. In these embodiments, the computer system may use the update history (e.g., the update rate or acceleration) of a node as a component when determining the condition score. For example, a high update rate may lower the condition score (where a lower score means the node is less likely to be defunct) because it may indicate that the node's data is frequently updated by a user or computer system, which may suggest that the node's data is fresh.

If the computer system determines that the first node is a passive consumer at operation 302, the computer system may determine the amount of time since the first was last purposefully observed at operation 305. In some embodiments, the computer system may use metadata associated with the first node to determine the amount of time since the first node was last observed. Whenever the first node is observed, a timestamp in the first node's metadata may be updated. The computer system may compare the timestamp to the current time to determine the amount of time since the first node was last observed.

After determining the amount of time since the first was last purposefully observed at operation 305, the computer system may determine whether the amount of time exceeds a threshold (e.g., an observation threshold) at decision block 306. The observation threshold may be the longest amount of time that a passive consumer node may go without being purposefully observed (e.g., accessed by a user) before the node is considered defunct. In some embodiments, the observation threshold may be specific to the first node. In these embodiments, the observation threshold may be saved in the metadata for the first node. In other embodiments, the observation threshold may apply to all passive consumer nodes in the lineage graph. In yet other embodiments, the observation threshold may apply to a subset of passive consumers in the lineage graph. The subset of passive consumers may include the first node. If the computer system determines that the time since the first node was last observed exceeds the observation threshold at decision block 306, the computer system may determine that the first node is defunct at operation 307 and the method 300 may end. Otherwise, the computer system may determine that the first node is not defunct at operation 308 and the method 300 may end.

In some embodiments, the computer system may determine that a passive consumer node is defunct (or generate a condition score for a passive consumer node), using the node's observation history. The observation history for a node may include information relating to how often the node has been viewed (e.g., an observation rate for the node). For example, the observation history for a particular node may show that over the past 30 days, the node has been viewed roughly 2 times a day on average. Additionally, the observation history may include information regarding a change in how often a node is viewed (e.g., a change in the observation rate, also referred to as an observation acceleration). Continuing the example from above, the observation history for the node may indicate that the node has only been viewed once over the last 10 days. In some embodiments, the time periods used to determine the observation rate or observation acceleration may be set by a user.

The computer system may determine whether a passive consumer node is defunct by comparing the observation rate to an observation rate threshold. If the observation rate for the node is less than the observation rate threshold, the computer system may mark the node as defunct. Likewise, the computer system may determine that the node is defunct if its observation acceleration over a predetermined period of time is less than an observation acceleration threshold. In some embodiments, the observation rate threshold and/or observation acceleration threshold may be set by a user and saved in metadata for the node.

As discussed herein, in some embodiments the computer system may generate a condition score for a node instead of determining whether it is defunct or not (e.g., instead of assigning the node a binary condition). The computer system may use any statistical method or model for generating the condition score. In these embodiments, the computer system may use the observation history (e.g., the observation rate or acceleration) of a node as a component when determining the condition score. For example, a high observation rate may lower the condition score (where a lower score means the node is less likely to be defunct) because it may indicate that the node is frequently accessed by a user or computer system.

Figure 4:
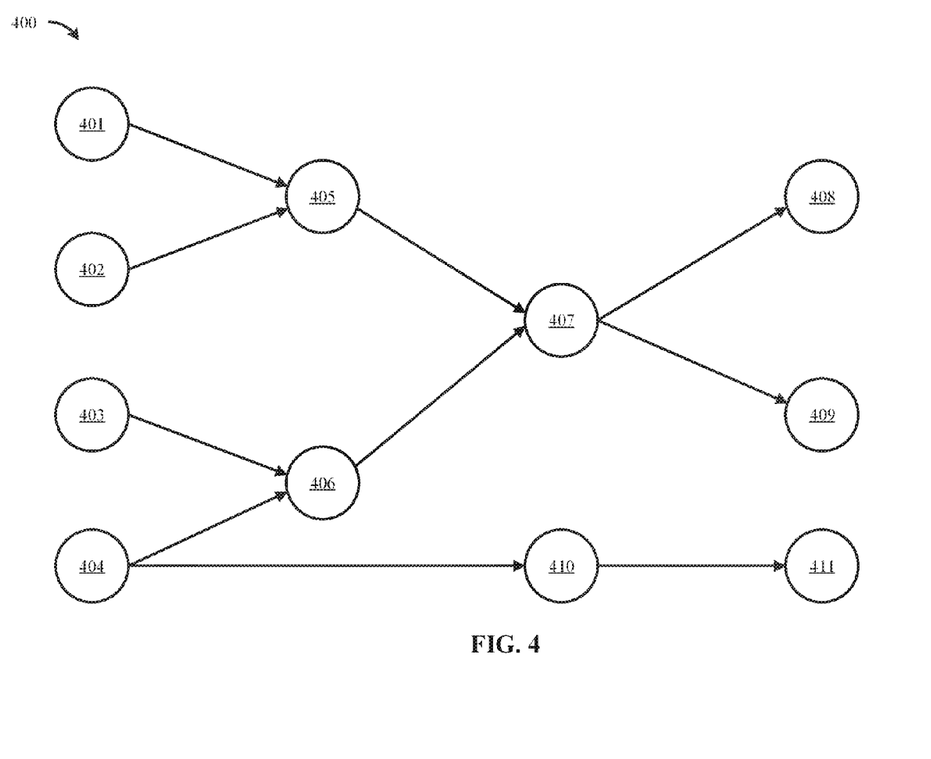
FIG. 4 illustrates an example of a lineage graph for a data processing system in which illustrative embodiments of the present disclosure may be implemented.

Referring now to FIG. 4, shown is an example of a lineage graph 400 for a data processing system in which illustrative embodiments of the present disclosure may be implemented. The lineage graph 400 includes eleven nodes 401-411. The first, second, and fourth nodes 401, 402, and 404 may be active producer nodes. The third node 403 may be a passive producer node. The fifth, sixth, and seventh nodes 405-407 may be active transformer nodes. The eighth and ninth nodes 408 and 409 may be passive consumer nodes. The tenth node 410 may be an active transformer node, and the eleventh node 411 may be a passive consumer node.

The computer system may determine the condition of each node 401-411 in the lineage graph 400. In the example discussed in reference to FIGS. 4-6, the condition of each node is a binary (e.g., the node is either defunct or operational). In some embodiments, however, the computer system may instead generate a condition score for each node. The computer system may analyze the nodes from left to right (e.g., starting with the producer nodes 401-404 and ending with the consumer nodes 408, 409, and 411). The computer system may recursively analyze the nodes until it makes a complete pass through the nodes without detecting any additional defunct nodes.

In the first pass through the lineage graph 400, the computer system may determine that the first, second, and third nodes 401, 402, and 403 are defunct (e.g., stale), as discussed herein (e.g., as discussed in reference to FIGS. 2 and 3). The computer system may also determine that the fourth node 404 is operational (e.g., not defunct). The computer system may then determine that the fifth node 405 is stale because both of its inputs (the first and second nodes 401 and 402) are stale. The computer system may also determine that the sixth node 406 is tainted because one of its inputs (the third node 403) is stale while another input (the fourth node 404) is operational.

The computer system may then determine that the seventh node 407 is tainted because one of its inputs (the fifth node 405) is stale and another input (the sixth node 406) is tainted. The computer system may also determine that the tenth node 410 is OK because its only input (the fourth node 404) is operational. Because the computer system has not yet analyzed the eleventh node 411, it is assumed to be operational when determining the condition of the tenth node 410. The computer system may then determine that the eighth and ninth nodes 408 and 409 are tainted because their only input (the seventh node 407) is tainted. The computer system may also determine that the eleventh node 411 is redundant by comparing the amount of time since the eleventh node was last observed to an observation threshold.

After marking each node according to the first pass, the computer system may make a second pass through the nodes to determine whether the condition of any nodes needs to be updated. During the second pass, the computer system may determine that the tenth node 410 is redundant because its only output node (the eleventh node 411) is redundant. Because the computer system identified another defunct node during the second pass, the computer system may make a third pass. The third pass may not result in any additional defunct nodes being identified. Accordingly, the computer system may generate a report for the data processing system after the third pass.

Figure 5:
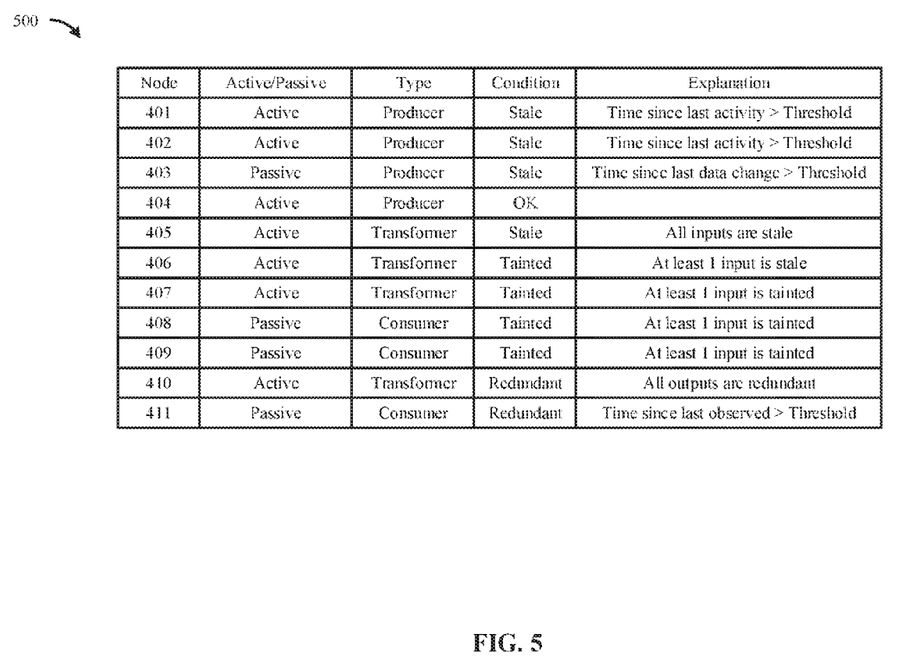
FIG. 5 illustrates an example report that may be generated for the data processing system of FIG. 4 and provided to a user, in accordance with embodiments of the present disclosure.

Referring now to FIG. 5, shown is an example report 500 that may be generated for the data processing system of FIG. 4 and provided to a user, in accordance with embodiments of the present disclosure. The report 500 is shown as a table for illustrative purposes. In some embodiments, however, the report 500 may be presented in a substantially different form, and the present disclosure should not be limited to the use of a table.

Each row in the report 500 may correspond to a different node in the lineage graph 400 (shown in FIG. 4), and each column may correspond to different information about the node. For example, the first column may include a unique identifier for each node (shown in FIG. 5 as the reference number of the node). The second column may identify whether each node is active or passive. The third column may correspond to the node type (e.g., producer, consumer, or transformer). The fourth column may correspond to the condition of the node (e.g., stale, redundant, tainted, or OK/operational). The fifth column may include an explanation of why a defunct node is considered defunct.

As discussed in reference to FIG. 4, the report 500 may indicate that the first, second, third, fifth, tenth, and eleventh nodes 401, 402, 403, 405, 410, and 411 in the lineage graph 400 in FIG. 4 are defunct nodes. The fourth node 404 may be marked as operational (e.g., OK) in the report 500, and the sixth, seventh, eighth, and ninth nodes 406-409 may be marked as tainted. Explanations may be given for each defunct and/or tainted node.

The report 500 may be provided to a user (e.g., displayed to a user using a computer monitor). The user may then select whether to remove the defunct nodes from the data processing system.

Figure 6:
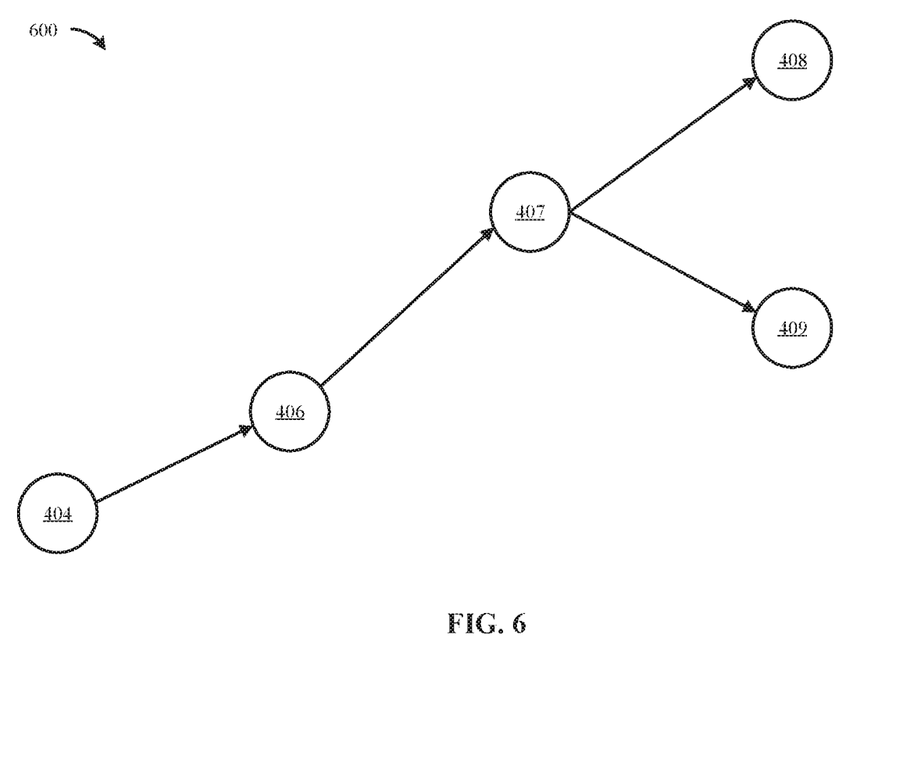
FIG. 6 illustrates an example lineage graph for the data processing system of FIG. 4 after defunct nodes have been removed, in accordance with embodiments of the present disclosure.

Referring now to FIG. 6, shown is an example lineage graph 600 for the data processing system of FIG. 4 after the defunct nodes have been removed, in accordance with embodiments of the present disclosure. The defunct nodes (e.g., the stale nodes 401, 402, 403, and 405, and the redundant nodes 410 and 411) in the lineage graph 400 may have been removed by a computer system in response to a user's input (e.g., after a user decided that they should be removed). The tainted nodes (e.g., nodes 406-409) and the operational node (e.g., node 404) may not have been removed. After the removal of the defunct nodes, the tainted nodes 406-409 may no longer be considered tainted (e.g., because they no longer have a stale input or redundant output). Accordingly, the resulting lineage graph 600 may only include operational nodes.

Figure 7:
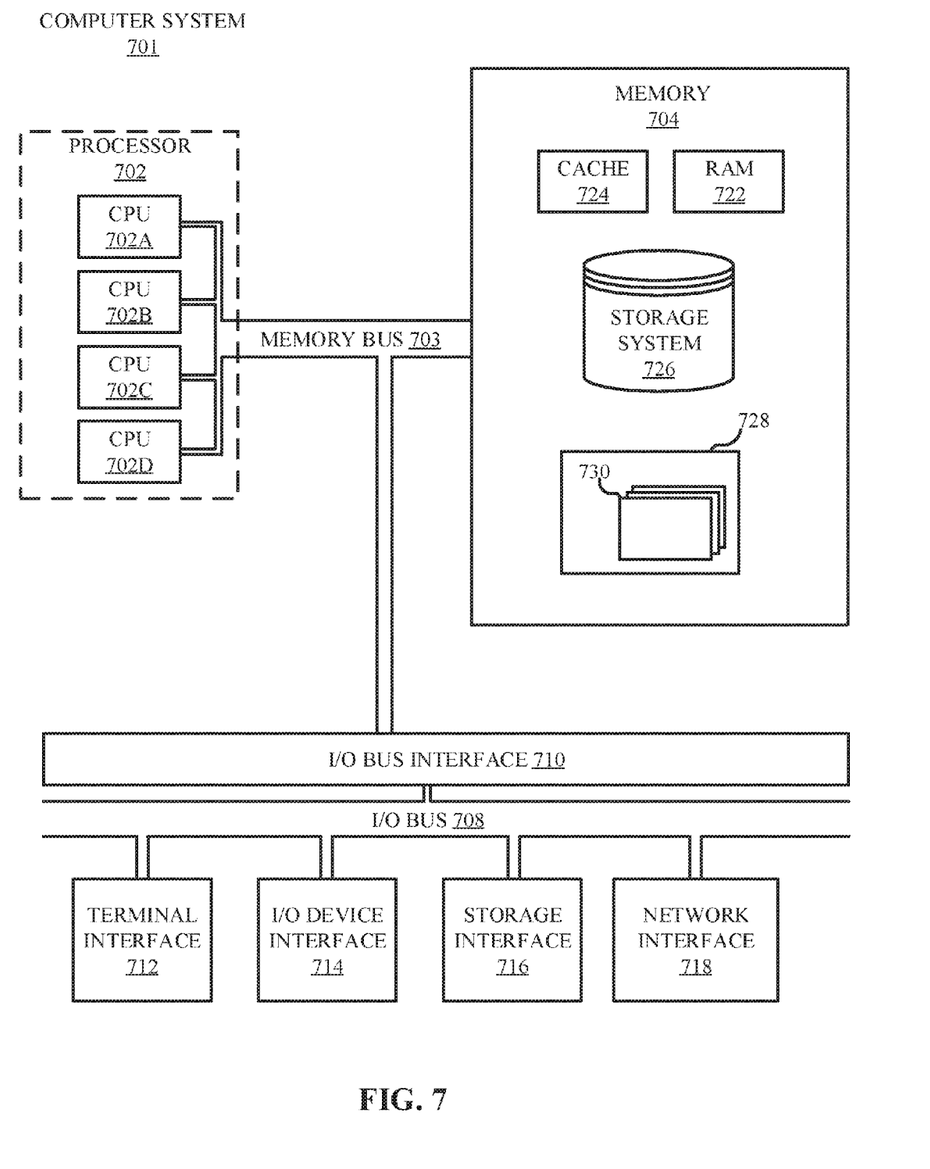
FIG. 7 illustrates a high-level block diagram of an example computer system that may be used in implementing one or more of the methods, tools, and modules, and any related functions, described herein, in accordance with embodiments of the present disclosure.

Referring now to FIG. 7, shown is a high-level block diagram of an example computer system 701 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer implemented method for identifying defunct nodes in a data processing system, the method comprising:

generating, by a computer system, a lineage graph for a data processing system, the lineage graph containing two or more nodes, the lineage graph identifying a flow of data through the data processing system;

identifying a first node in the lineage graph, wherein the first node is an active node that processes protected health information about one or more individuals;

determining, from the metadata for the first node, a maximum amount of time that protected health information may be stored without being processed;

determining an amount of time since the first node last processed the protected health information;

comparing the amount of time to the maximum amount of time;

determining, in response to the comparing, that the first node is a defunct node;

identifying a second node in the lineage graph, the second node being a passive producer node;

determining a second amount of time, the second amount of time being an amount of time since data in the second node was last updated;

comparing the second amount of time to a threshold;

determining, in response to comparing the second amount of time to the threshold; that the second node is operational;

identifying a third node in the lineage graph, the third node being an active transformer node that has first and second inputs;

determining that the first input for the third node is defunct;

determining that the second input for the third node is operational;

determining, based on the first input being defunct and the second input being operational, that the third node is tainted;

generating a report for the data processing system, the report including an indication that the first node is defunct, the second node is operational, and the third node is tainted, the report further including an explanation of why the first node is a defunct node;

adding an indication that the first node is a defunct node into metadata of the first node, the indication that the first node is a defunct node including the explanation;

providing the report to a user;

prompting the user to determine whether to remove the first node from the data processing system;

receiving, from the user, an indication that the first node is to be removed from the data processing system; and removing the first node from the data processing system.

* * * * *